United States Patent [19]

Yamada

[11] Patent Number: 4,809,137
[45] Date of Patent: Feb. 28, 1989

[54] BACK-MIRROR FITTED WITH ILLUMINATION LIGHT AT CAR SIDE

[76] Inventor: Kiyoshi Yamada, 3-2-21-403 Shinosado, Nishinari-ku, Osaka-shi, Japan

[21] Appl. No.: 99,125

[22] Filed: Sep. 21, 1987

[30] Foreign Application Priority Data

Jul. 24, 1987 [FR] France ................................ 87 8093

[51] Int. Cl.$^4$ .............................................. B60Q 1/24
[52] U.S. Cl. ........................................ 362/61; 362/66; 362/80; 362/144; 362/285; 362/386
[58] Field of Search ...................... 362/61, 66, 80, 138, 362/139, 142, 143, 144, 285, 286, 386

[56] References Cited

U.S. PATENT DOCUMENTS

| | | | |
|---|---|---|---|
| 2,511,971 | 6/1950 | Dalton | 362/66 X |
| 3,522,584 | 8/1970 | Talbot | 362/80 X |
| 3,596,079 | 7/1971 | Clark | 362/144 |

FOREIGN PATENT DOCUMENTS

81/02871 10/1981 PCT Int'l Appl. ................... 362/61

Primary Examiner—Ira S. Lazarus
Assistant Examiner—Sue Hagarman
Attorney, Agent, or Firm—Bauer & Schaffer

[57] ABSTRACT

Present invention relates to car back-mirror fitted with illumination light. In the conventional cars, forward and backward driving in the night time face no problems with the aid of head lights and rear lamps mounted at the front and rear ends of the car, but sighting of objects approaching from dark right and left side direction of the car or from up or down direction is very difficult due to no side lights. In order to solve the above-mentioned problems, the present invention provides car back-mirror fitted with illumination light which can be rotated in all directions so that dark side directions of the car may be irradiated.

4 Claims, 6 Drawing Sheets

FIG. 2A
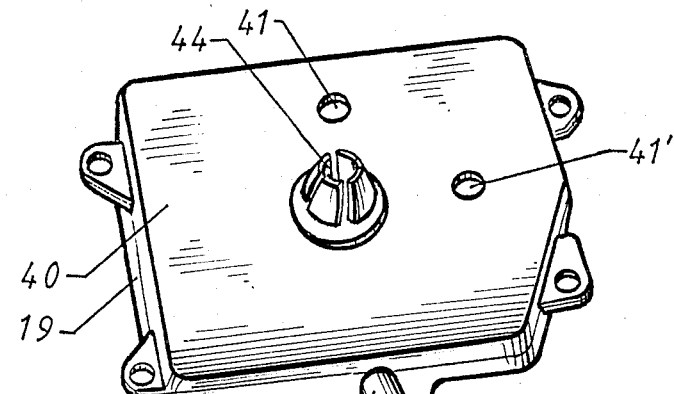
FIG. 2B
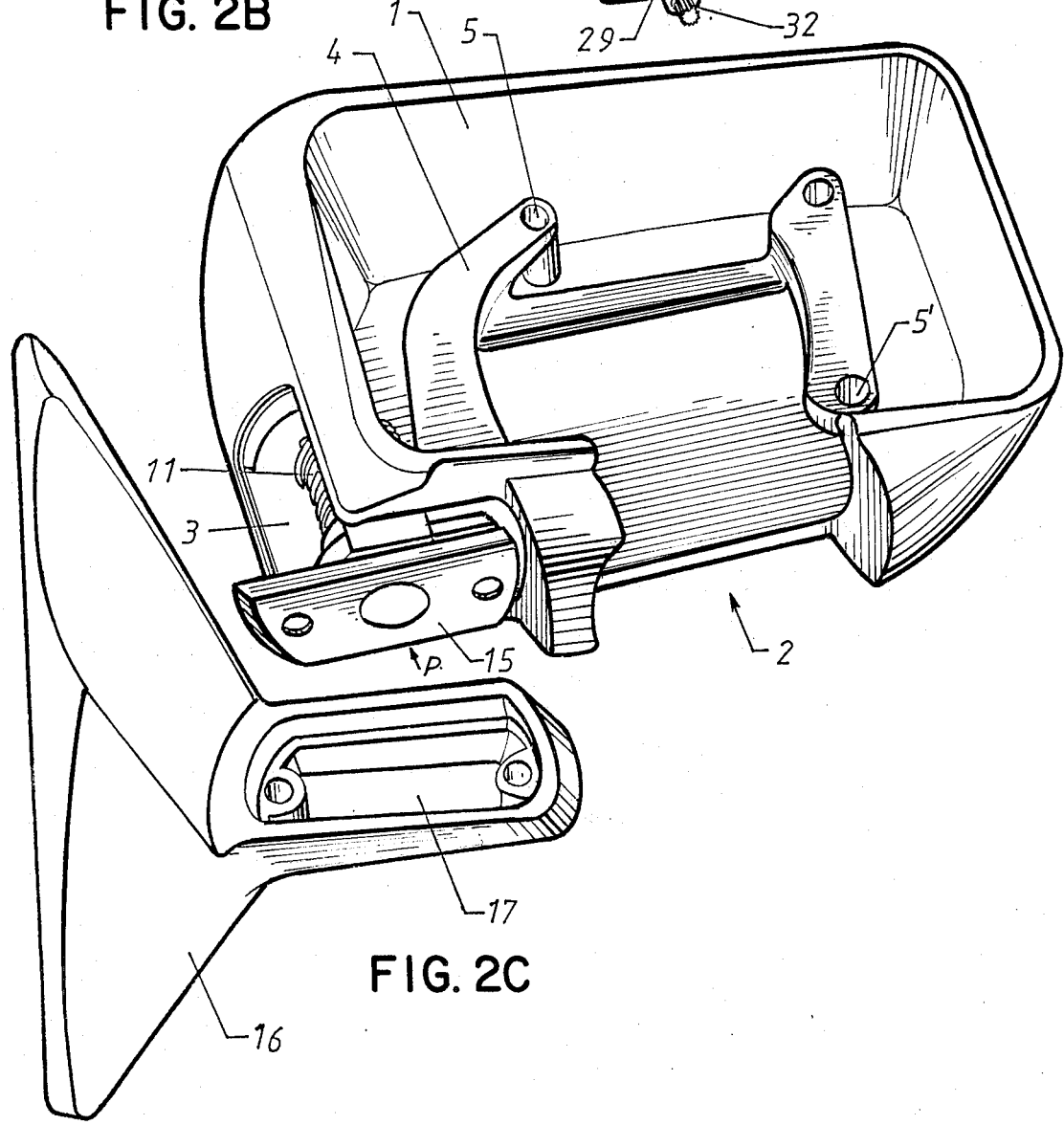
FIG. 2C

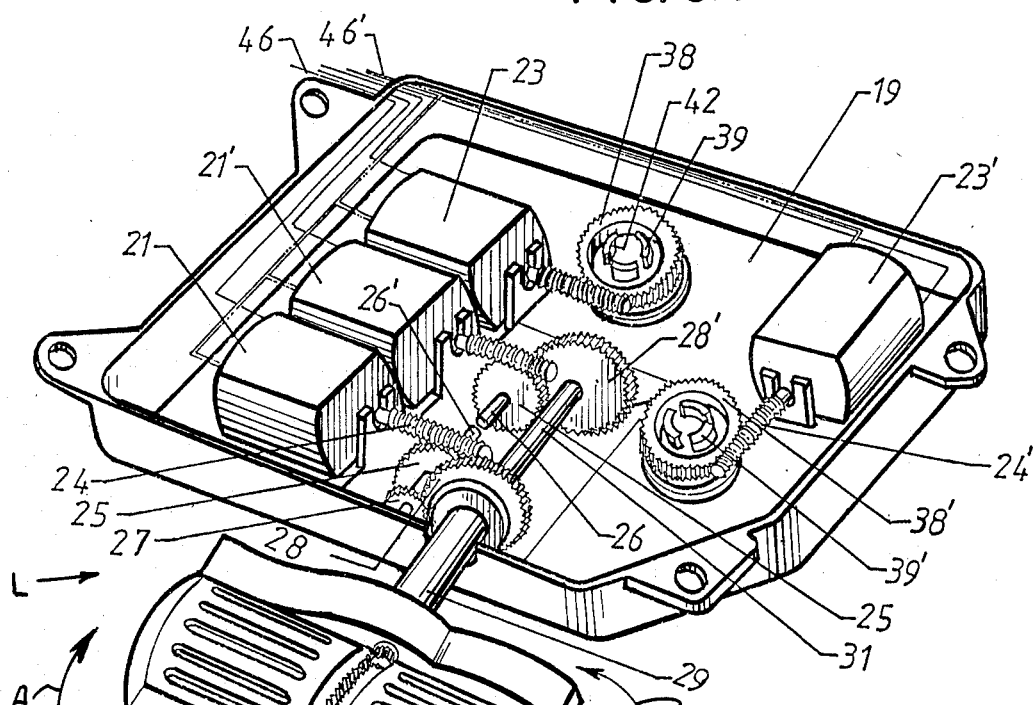
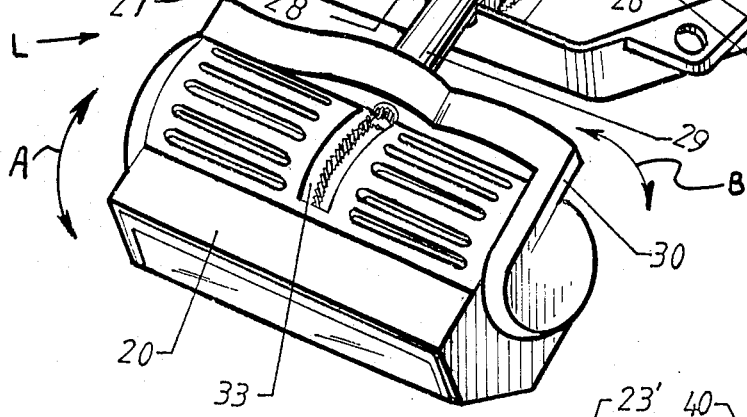
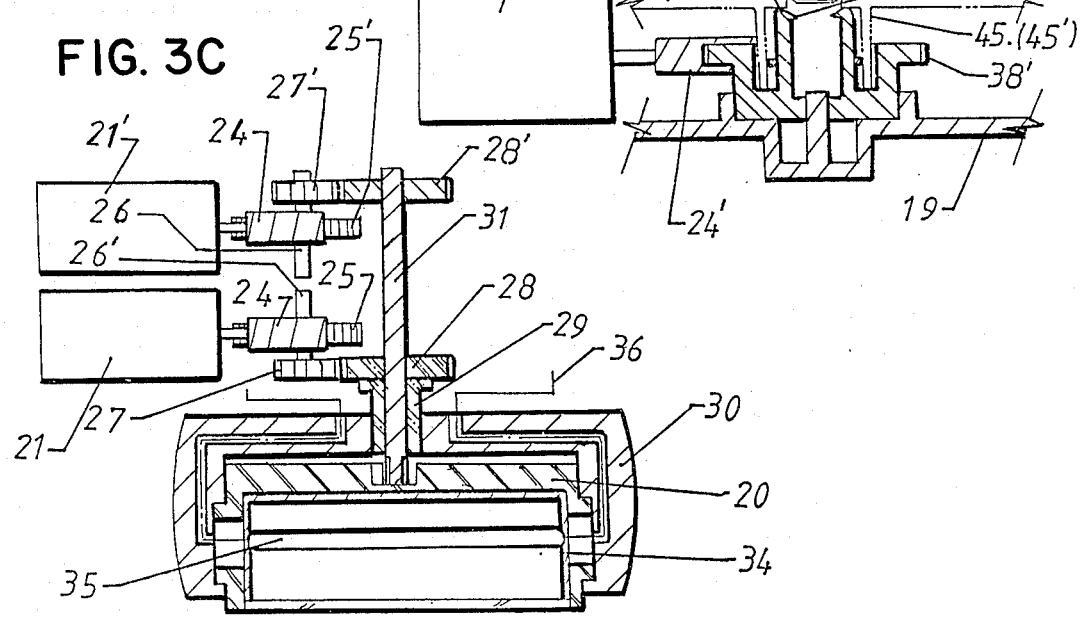

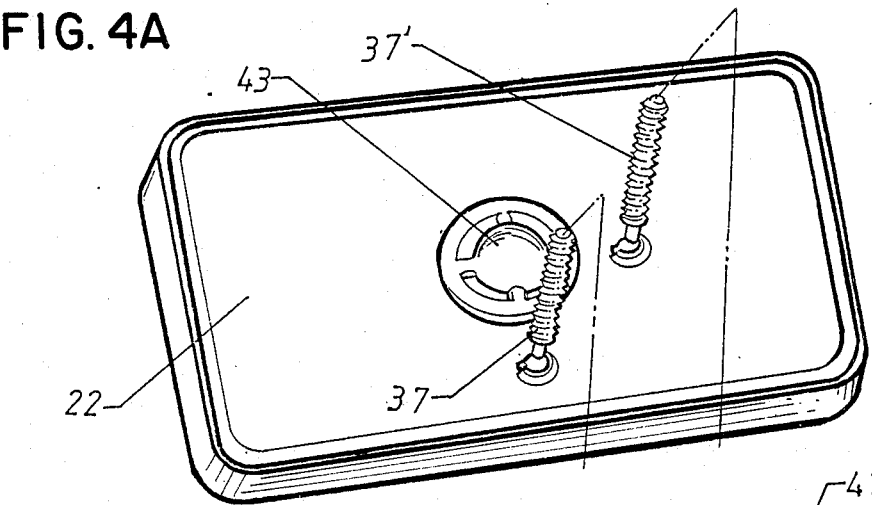
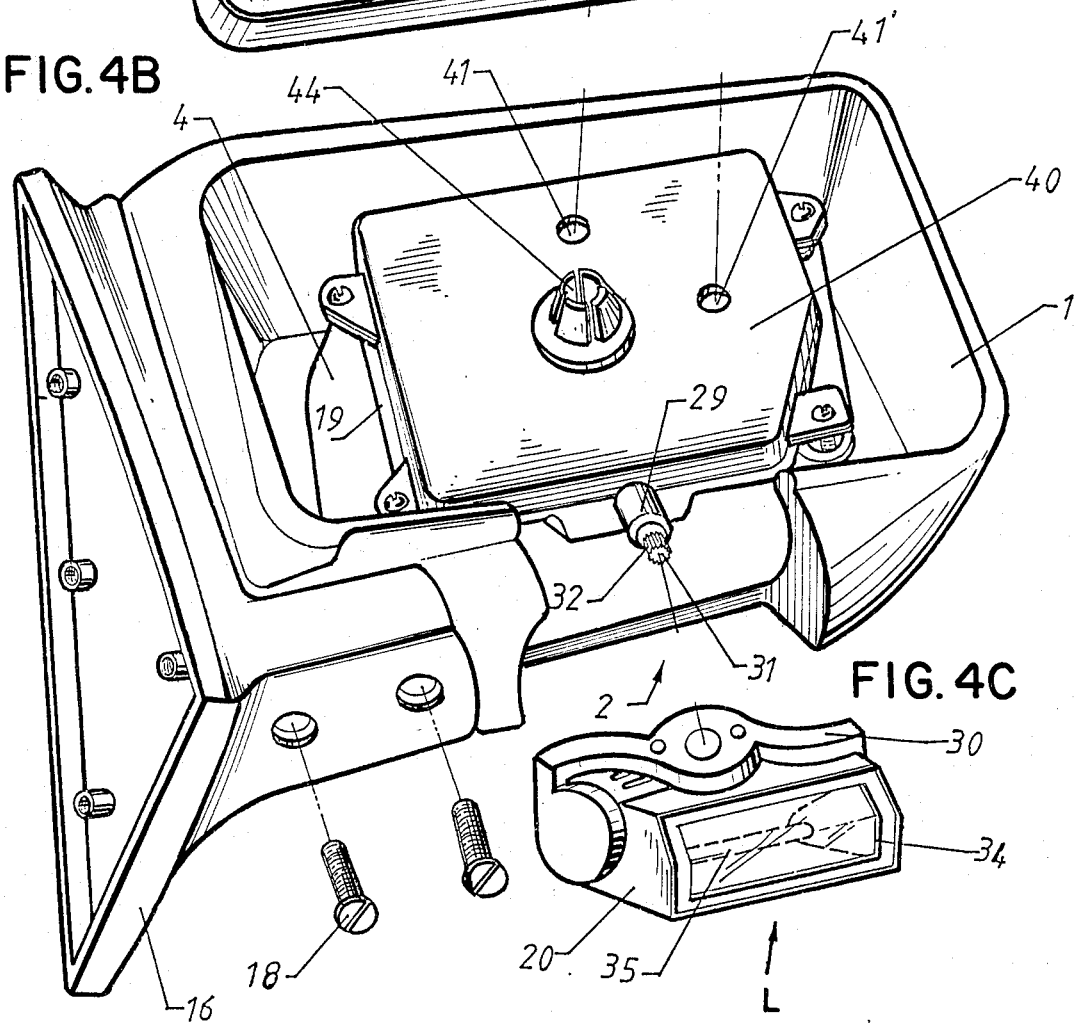
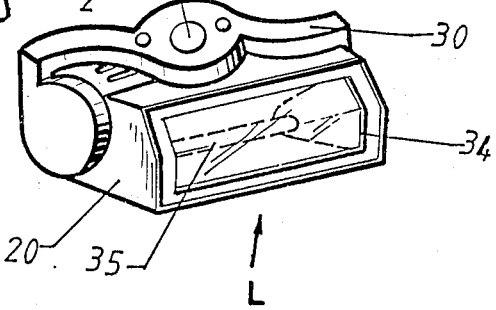

BACK-MIRROR FITTED WITH ILLUMINATION LIGHT AT CAR SIDE

FIELD OF INVENTION

The present invention relates to car back-mirror fitted with Illumination light, and in particular to car back-mirror provided with Illumination light in the case thereof, characterized in that said Illumination light being mounted to be rotated in all directions so that dark side or side direction of the car may be easily Iluminated.

In the conventional cars, forward and backward driving of the car in the night time meet no problems with the aid of head lights and rear lamps mounted at the front and rear ends of the car, but sighting of objects approaching from dark right or left side direction of the car or from up or down direction is very difficult due to the darkness.

Especially in the night time, backward driving or approach driving to other cars or walls as well as driving for garaging are very troublesome because of the darkness of side directions of the car and as a result safety driving is greatly hindered.

In order to solve the above-mentioned problems, the present invention provides illumination lights rotatable for irradiating dark side and dark direction of the car, which can be mounted in back-mirror cases.

Illumination lights will be mounted in back-mirror cases of the car in such a way that the illumination lights may be rotated in all directions and concurrent rotation of back-mirrors may be caused. In this way, dark side and side direction of the car may be irradiated by the illumination lights optionally as needed. Conseqüently safety driving in night time can be achieved, because circumference of the car can be easily confirmed when the car is driven backward or driven to approach to other cars as well as for garaging.

Furthermore, circumference of the car may be confirmed by a driver's direct eyesight as well as by an indirect sighting of the driver from his seat throught car back-mirrors.

The invention will now be described by way of example with reference to the annexed drawings.

BRIEF DESCRIPTION OF THE DRAWINGS

FIG. 2 are exploded perspective views of a pillar and a mechanism in which:

FIG. 2 (A) is a perspective view of the mechanism which operates to steer the illumination light in all directions and also to steer the back-mirror up and down directions.

FIG. 2 (B) is a perspective view of the base plate and the steering tube encased together in the back-mirror case.

FIG. 2 (C) is a right side view of a pillar, showing a retainer for receiving a steering base plate.

FIG. 3 are perspective.view of internal structure of the mechanism in which:

FIG. 3 (A) is a perspective view of the interior of the mechanism, showing members engaged with a driving shaft and a shaft tube.

FIG. 3 (B) is an enlarged vertical section of worms and helical gears.

FIG. 3 (C) is an enlarged vertical section, showing the illumination light being engaged with the driving shaft and shaft tube.

FIG. 4 are exploded perspective views of the back-mirror and illumination light in which:

FIG. 4 (A) is a perspective view of the back of the back-mirror, showing driving screws and a coupler.

FIG. 4 (B) is a plain perspective view of the back-mirror case in which the mechanism case is fixed to the base plate by screws and the steering base plate is fixed to the retainer by screws whereby the assembled back-mirror case may by moved along the pillar.

FIG. 4 (C) shows an illumination light with a reflection member being directed upwards, ready to be inserted in the illumination light insertion opening.

FIG. 5 are perspective views of the present invention in which:

FIG. 5 (A) is a plain perspective view, showing a reflection lamp of the illumination light being driven upwards.

FIG. 5 (B) is a plain perspective view, showing a reflection lamp of the illumination light being driven downwards.

FIG. 6 are operational drawings of the illumination light in which:

FIG. 6 (A) shows the illumination light being driven to the left.

FIG. 6 (B) shows the illumination light being driven to the right.

LEGEND

Figure 1:
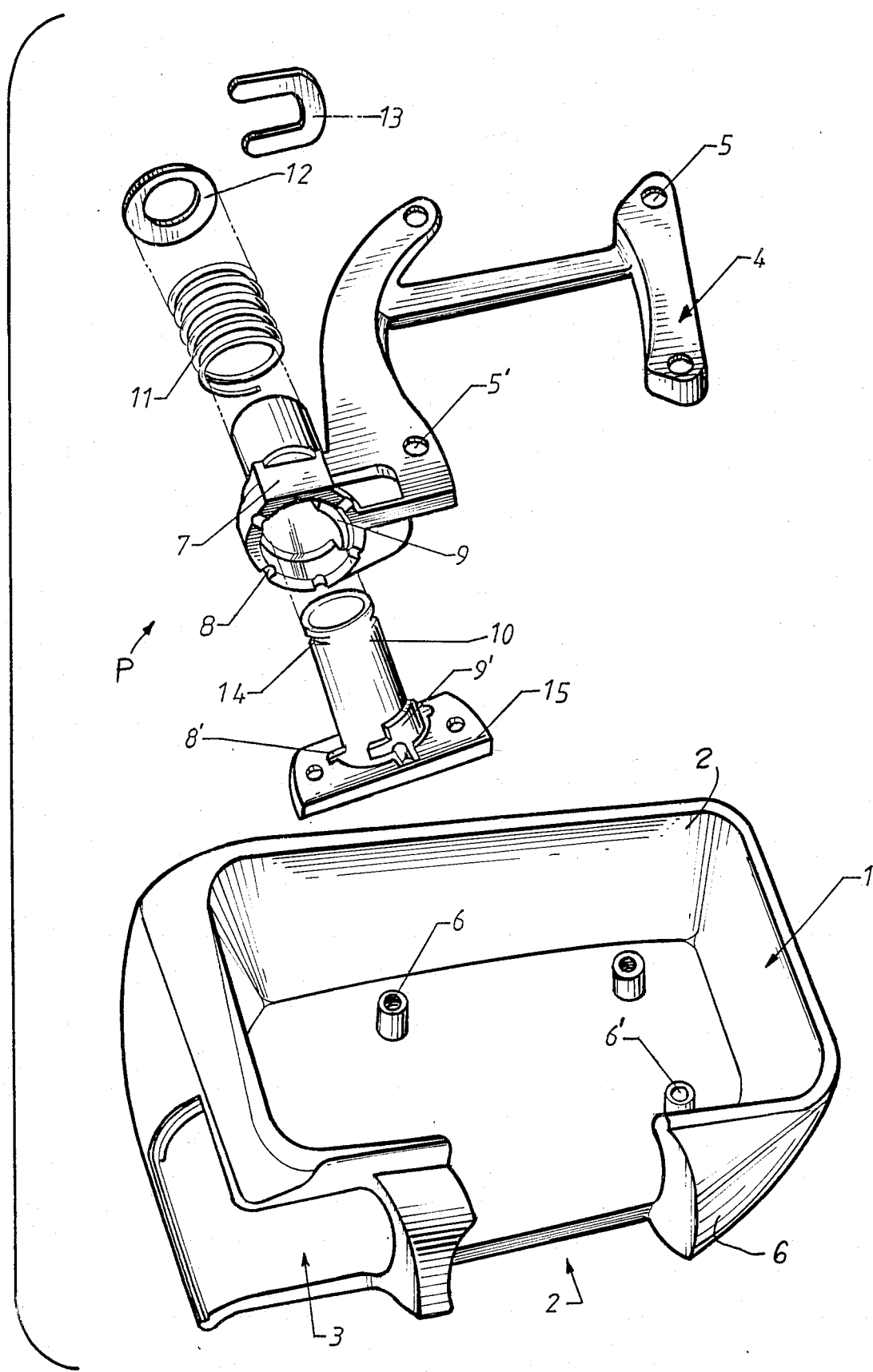
FIG. 1 are a perspective view of a back-mirror case provided with an illumination light insertion opening and a steering rod insertion opening according to the invention, and an exploded view of a base plate with a steering rod and steering tube, to be moutned in the back-mirror case.
Figure 5A:
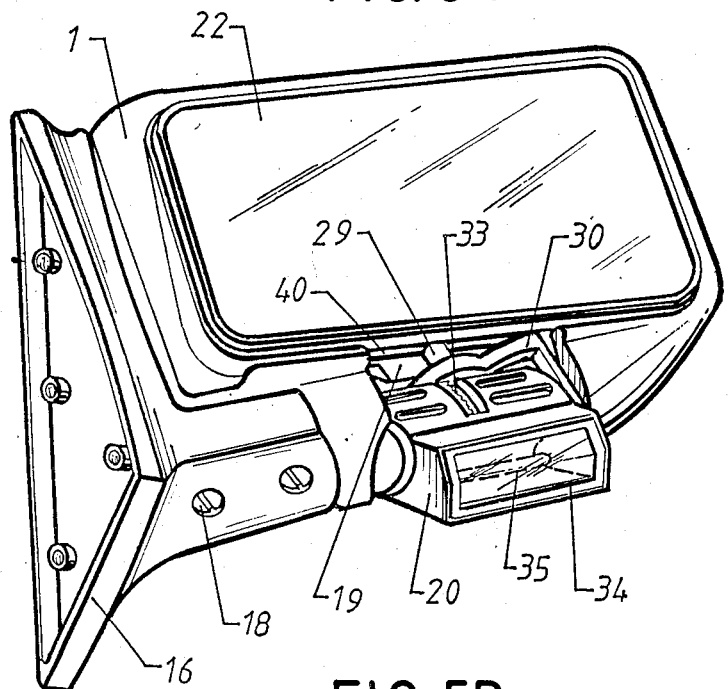
Figure 5B:
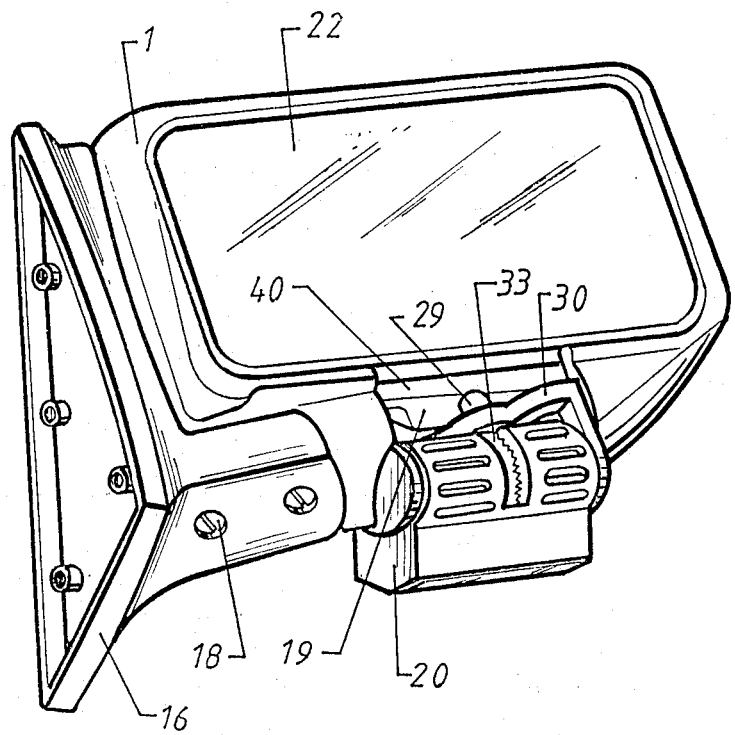
Figure 6A:
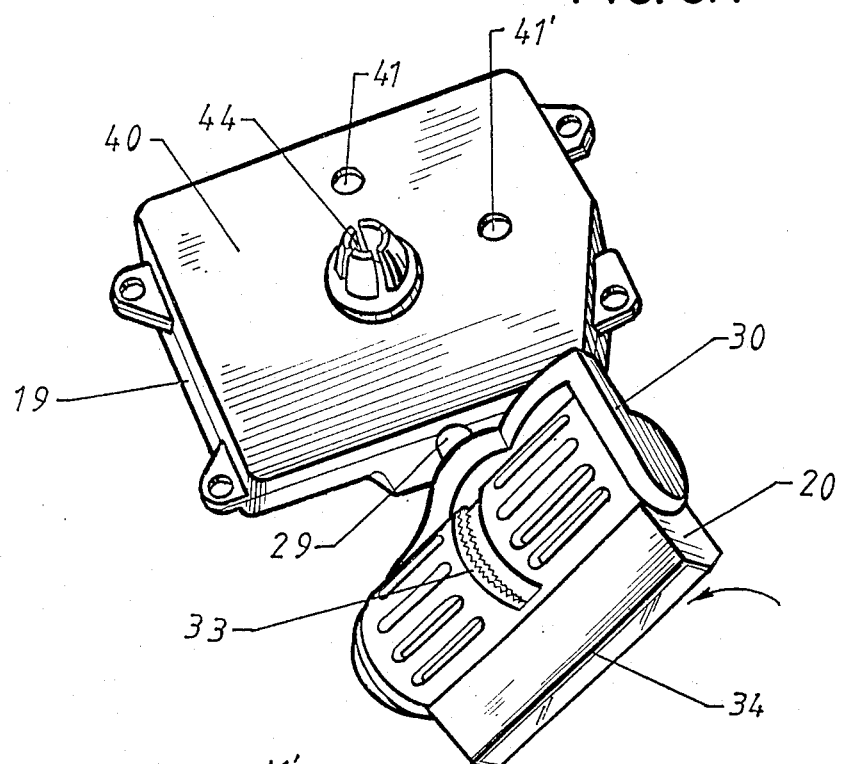
Figure 6B:
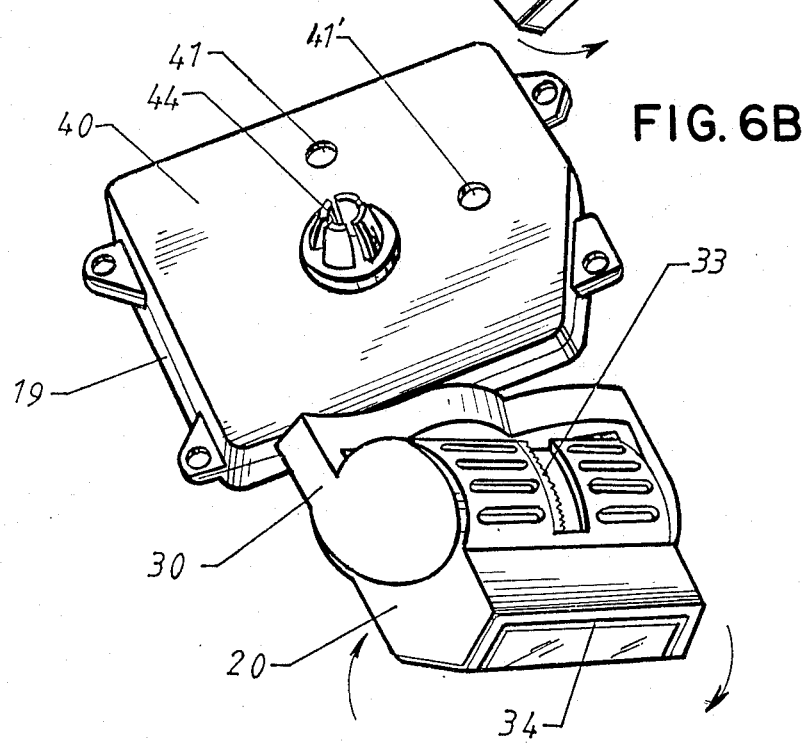

1. Back-Mirror Case
2. Illumination Light Insertion Opening
3. Steering Rod Insertion Opening
4. Base Plate
7. Steering Tube
10. Steering Rod
11. Coil Spring
13. Clip
14. Clip Recess
19. Mechanism Case
20. Illumination Light
29. Shaft Tube
30. Support Frame
31. Driving Shaft
32. Knurling Member
33. Guiding Knurling Member
40. Mechanism Case Lid
41. 41' Holes

DETAILED DESCRIPTION OF THE INVENTION

Referring to the drawings, a back-mirror case 1 is provided with an illumination light insertion opening 2 at lower wall and a steering rod insertion opening 3 at a left side edge. A base plate 4 is placed in the case 1 in such a way that connecting holes 5, 5' opened in each corner of the base plate 4 may correspond to respective connecting holes 6, 6' of the case 1, and a steering tube formed at one end of the base plate 4 as an integral part thereof is also encased in the case 1, together with the base plate 4.

At lower end of the steering tube 7 a plurality of slots 8 are formed, and a shoulder 9 is projected inwardly from the inside wall of the steering tube 7. A steering rod 10 having a shoulder 9' and a plurality of noses 8' at the bottom thereof will be pushed into the steering tube 7, whereby causing the noses 8' to fit snugly into corresponding slots 8.

A resilient coil spring 11 will be inserted along outside wall of the steering tube 7 and a washer 12 placed over the coil spring 11 will press the coil spring 1 until a clip 13 reaches and fits into a clip recess 14 formed at an upper part of the steering rod 10.

A steering base plate 15 formed at a lower end of the steering rod 10 as an integral part thereof is fitted into a retainer 17 of a pillar 16, and the steering base plate 15 and the retainer 17 are fixed together by screws, and the inside surface of the pillar 16 contacts with the left wall and the steering rod insertion opening 3 of the back-mirror case 1 whereby only the back-mirror case 1 may be moved along the pillar 16.

Inside the mechanism case 19, motors 21, 21' for driving the illumination light 20 and motors 23, 23' for driving the back-mirrors are disposed respectively. Worms 24 are coupled to motors 21, 21' while worms 24' are coupled to motors 23, 23' respectively. Worms 24 for the illumination light 20 engage with helical gears 25 and 25'. At other ends of two shafts 26, 26' having helical gears 25, 25' respectively, driving worm gears 27, 27' are attached and mesh with driven worm gears 28, 28' mutually.

Driven worm gear 28 is fixed at one end of a shaft tube 29, and the other end of the shaft tube 29 engages with a support frame 30 retaining the illumination light 20. A driving shaft 31 having the worm gear 28' at one end forms a knurling member 32 at other end and causes the knurling member 32 to engage with a guiding knurling member 33 of the illumination light 20 by passing through the inside of the shaft tube 29.

Inside the illumination light 20, a reflection panel is disposed and a light bulb 35 is provided. Electric wire connected to both ends of the illumination light 20 is led to outside via the inside of the support frame 30.

Two worms 24' coupled to the motors 23, 23' for driving the backmirror 22 engage with helical gears 38, 38' which thread or unthread driving screws 37, 37' loosely attached to the back of the back-mirror 22. Helical rings 39, 39' are formed inside the helical gears 38, 38' and communicate with holes 41, 41' when the mechanism cover lid 40 is put on the mechanism case 19.

When driving screws 37, 37' are threaded in the holes 41, 41', lower ends of the driving screws 37, 37' are tightened around inside projections 42, 42' of the helical rings 39, 39' while a coupler 43 is placed over an engagement ring 44 of the mechanism case lid 40, and tube clamps 45, 45' projected in tubular form from the back of the mechanism case lid 40 serve as support members to keep the helical gears 38, 38' from being lifted.

Reference numerals 46 and 46' are lead wires connecting each of the motors 21, 21' and 23, 23' to power source.

In practice, the present invention is used by fixing a pillar 16 to each side window frame of the car as the conventional back-mirror is being fixed to the side window frame, and lead wires 46, 46' and electric wire 36 will be connected to the power source of the car.

In order to drive the illumination light 20 up or down direction, motor 21' for driving the illumination light 20 will be actuated and the worm 24 drives the helical gear 25', which in turn drives the driving worm gear 27' of the shaft 26.

As a driven worm gear 28' meshes with the driving worm gear 27', driving worm gear 27' causes the driven worm gear 28' to drive and a driving shaft 31 having the driven worm gear 28' is also caused to drive.

While the driving shaft 31 is rotating by itself inside the shaft tube 29, a knurling member 32 formed at an upper end thereof causes the illumination light 20 to rotate toward down direction because it engages with a guiding knurling member 33 of the illumination light 20, and down direction of the car may be irradiated from the right and left side of the car.

On the contrary, illumination light 20 may be rotated toward up direction with a reverse switch (not shown) of the motor 21' in a reverse operation, and upside direction of the car may be irradiated from the right and left side of the car.

In this way, it is possible to rotate the illumination light 20 by the driving shaft 31 and thus to irradiate up and down direction as well as right and left direction of the car.

For irradiating in the direction of front and rear acute angles with the rotation of the illumination light 20 as well as irradiating in the right and left side direction, motor 21 for driving the illumination light 20 will be actuated and worm 24 drives the helical gear 25 which in turn drives a driving worm gear 27 of the shaft 26, whereby causing a driven worm gear 28 fixed at one end of the shaft tube 29 to rotate, and the shaft tube 29 will be driven concurrently.

With the driving of the shaft tube 29, support frame 30 fixed at the front end of the shaft tube 29 rotates to the left direction, whereby causing concurrent rotation of the illumination light 20, and thus rear acute angle may be irradiated from the right and left side of the car.

On the contrary, in order to irradiate in the direction of front acute angle from the right and left side of the car, support frame 30 and illumination light 20 may be rotated with a reverse switch (not shown) of the motor 21 in a reverse operation, and front acute angle as well as the right and left side direction of the car may be irradiated from the right and left side of the car.

As mentioned, the present invention is constructed so as to irradiate in all directions of the car by rotating the illumination light 20, and also constructed in a way so as to rotate the back-mirror 22 similarly, function of which is now explained.

Driving screws 37, 37' loosely attached to the back of the backmirror 22 are threaded in the holes 41, 41' opened in the mechanism case lid 40 and lower ends of the driving screws 37, 37' are tightened around inside projections 42, 42' of the helical rings 39, 39' while a coupler 43 is placed over the engagement ring 44, and tube clamps 45, 45' projected in tubular form from the back of the mechanism case lid 40 serve as support members to keep the helical gears 38, 38' from being lifted.

When one motor 23' of the motors 23, 23' is actuated, helical gear 38' is driven with the rotation of the worm 24' and a driving screw tightened around inside projection 42' of the helical ring 39' is pulled, whereby causing the back-mirror 22 to steer to the right direction for receiving images of objects or places irradiated from the illumination light 20.

For steering the back-mirror 22 to the left direction, another motor 23 will be actuated to steer the back-mirror 22 in the above-mentioned process.

To release the driving screws 37, 37' from the inside projections 42, 42', forward-reverse switches (not shown) of the motors 23, 23' will be actuated for such an operation.

According to the present invention, all directions of the car may be irradiated by rotating the illumination light 20 optionally in all directions. By using the illumination light 20 of the present invention, safety driving in the night time, particularly in case of driving in crowded places or garaging the car, can be achieved. Especially driver's visibility may be extended when the car is driven on curved roads.

The present invention may also be used in case of changing tires in night time, coupling or uncoupling of chains in snow season and in other repair works of the car.

By fixing the pillar 16 to the side window frame of the car, location of the back-mirror case 1 only may be easily adjusted by manual operation, because the steering base plate 15 and the retainer 17 are fixed together by screws while the steering rod 10 is pushed into the steering tube 7 formed at one end of the base plate 4 and a resilient coil spring 11 is inserted along the outside wall of the steering tube 7 and pressed by a clip 13 which is fitted into a clip recess 14.

I claim:

1. Back-mirror fitted with illumination light at car side, comprising a back-mirror case 1 provided with an illumination light insertion opening 2 at lower wall and a steering rod insertion opening 3 at a left side edge, a steering tube formed at one end of a base plate 4 as an integral part thereof being encased in said case 1 together with said base plate 4, a steering rod being pushed into said steering tube 7 and a resilient coil spring 1 inserted around said steering tube 7 being pressed until a clip 13 fits snugly into a clip recess 14, a mechanism case 19 with a mechanism case lid 40 having holes 41, 41' being fixed to said base plate 4 in said case 1, a support frame 30 retaining an illumination light 20 being fixed at one end of a shaft tube 29, and said illumination light 20 being inserted into said illumination light insertion opening 2 so that a knurling member 32 formed at a front end of a driving shaft 31 may engage with a guiding knurling member 33 of said illumination light 20, characterized in that said illumination light 20 may be rotated toward up and down direction by the rotation of said driving shaft 31 and in right and left direction by the rotation of said shaft tube 29.

2. Back-mirror fitted with illumination light at car side according to claim 1, characterized in that said illumination light 20 is rotatably inserted into said illumination light insertion opening 2 provided at lower wall of said case 1.

3. Back-mirror fitted with illumination light at car side according to claim 1, characterized in that said case 1 comprises said illumination light insertion opening 2 at lower wall and said steering rod insertion opening 3 at a left side edge, and that said illumination light 20 retained by said support frame 30 may be inserted into said illumination light insertion opening 2.

4. Back-mirror fitted with illumination ligth at car side according to claim 1, characterised in that said shaft tube 29 and said driving shaft 31 being arranged in said mechanism case 19 provided with said mechanism case lid 40 having holes 41, 41', and that said mechanism case 19 and said mechanism case lid 40 being fixed to said base plate 4 in said case 1.

* * * * *

UNITED STATES PATENT AND TRADEMARK OFFICE
CERTIFICATE OF CORRECTION

PATENT NO. : 4,809,137

DATED : February 28, 1989

INVENTOR(S) : Kiyoshi Yamada

It is certified that error appears in the above-identified patent and that said Letters Patent is hereby corrected as shown below:

On the title page,

"[30] FOREIGN APPLICATION PRIORITY DATA

Jul. 24, 1987 [FR] France.............87 8093"

should read

--[30] FOREIGN APPLICATION PRIORITY DATA

July 24, 1987    Korea..............87 8093--.

Signed and Sealed this

Ninth Day of January, 1990

Attest:

JEFFREY M. SAMUELS

Attesting Officer    Acting Commissioner of Patents and Trademarks